UNITED STATES PATENT OFFICE.

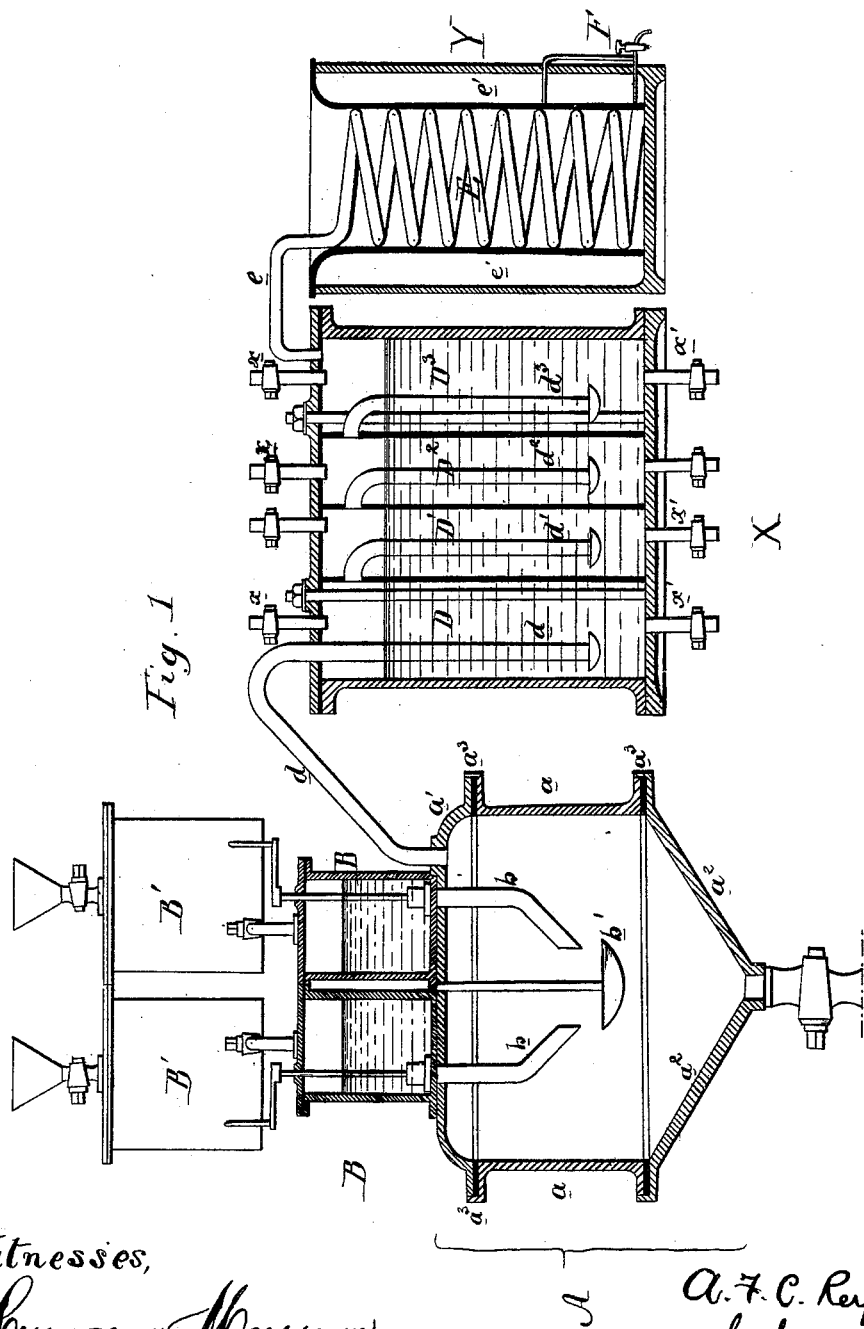

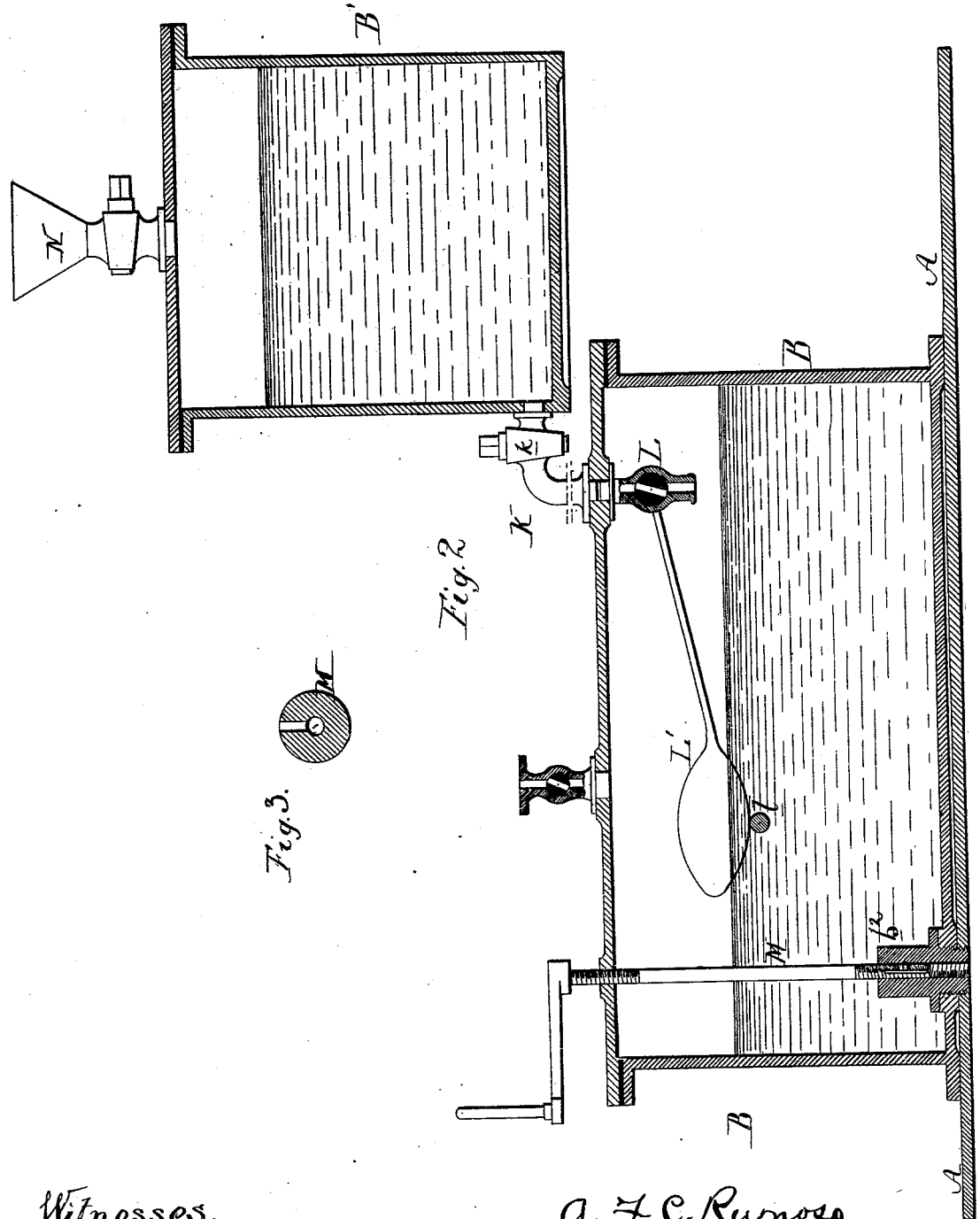

ALVARO FRANCISCO CARLOS REYNOSO, OF PARIS, FRANCE.

IMPROVEMENT IN APPARATUS FOR MANUFACTURING SULPHUROUS ACID.

Specification forming part of Letters Patent No. 185,964, dated January 2, 1877; application filed September 27, 1876.

*To all whom it may concern:*

Be it known that I, ALVARO FRANCISCO CARLOS REYNOSO, of Paris, France, have invented an Improved Apparatus for the Manufacture of Sulphurous Acid, of which the following is a specification:

The object of my invention is to simplify and facilitate the manufacture of sulphurous acid, and this object I attain as hereafter described, reference being had to the accompanying drawings, in which—

Figure 1, Sheet 1 is a sectional view of the vessels for producing, purifying, drying, and condensing the sulphurous-acid gas; and Fig. 2, Sheet 2, a sectional view of the automatically-regulated supply-vessels.

Referring to Fig. 1, A is the producing-vessel, consisting of the cylindrical portion $a$, top $a^1$, and conical bottom $a^2$, the three parts being connected together by flanges, bolted to each other, with an intervening packing of rubber or other material, and the vessel is rendered still more air-tight by one or other of the corresponding flanges having an overlapping portion, $a^3$. Through the top of this vessel project two bent tubes, $b\ b$, and immediately below the lower ends of these tubes is a cup, $b'$, suspended in the interior of the vessel by any suitable means, while the upper end of each tube is in communication with an automatic supply-vessel, B, through a regulating-valve, as more fully described hereafter.

A pipe, $d$, leads from the vessel A to the vessel X, which is divided into a series of chambers, D, $D^1$, $D^2$, and $D^3$, each having an inlet-tube, $x$, and outlet-tube $x'$, furnished with suitable cocks, and into the first of these chambers projects the pendent portion of the tube $d$, provided with a perforated rose on the end. Leading from the upper portion of this chamber D is a pendent tube, $d^1$, which extends to near the bottom of the chamber. Similar tubes $d^2\ d^3$ are provided for the chambers $D^2$ and $D^3$, respectively. A pipe, $e$, leads from the upper part of the chamber $D^3$ to the condensing-coil E, contained in the vessel Y, which has double walls, forming a chamber, $e'$, for the reception of a refrigerating-mixture. F is a gage and cock for drawing off the products of condensation.

One supply-tank, B, contains liquid sulphuric acid, while the other contains bisulphite of soda or other bisulphite, and the chamber D is filled more than two-thirds full of bisulphite, while the chambers $D^1\ D^2\ D^3$ contain chloride of calcium or pumice stone saturated with sulphuric acid, for drying the gas.

The valves in the supply-vessels B B being opened to an extent requisite for the passage of chemically-equivalent quantities of the sulphuric acid and bisulphite, these latter pass through the tubes $b\ b$ and fall into the cup $b'$, where the sulphuric acid and bisulphite react on each other, and produce sulphurous-acid gas. Should any of the liquid fall from the cup $b'$ the reaction will be completed on the conical bottom of the vessel, but the cup generally suffices for the continuous reaction of the liquids. The gas passes from the vessel A through the pipe $d$ to the chamber D, where it passes through the bisulphite, and thence through the pumice in the chambers $D^1\ D^2$, and $D^3$, where it is thoroughly dried and purified. The gas then passes through the pipe $e$ to the condenser, whence it is drawn off in the form of a liquid.

It is very requisite that the reaction of the bisulphite on the sulphuric acid should be perfectly uniform and regular, and for this purpose I employ the automatic supply-tanks shown in Fig. 2, Sheet 2, in which A is the top of the producing-vessel, on which each tank B rests, and which communicates with each tank through a threaded opening, $b^2$. Each tank B also communicates with an upper tank, B', through a pipe, K, which is supplied with a cock, $k$, and projects into the tank B. Only one set of tanks B and B' is shown in Fig. 2, but there are two to each vessel, A, as shown in Fig. 1, one set for the bisulphite and the other for the sulphuric acid. The portion of the tube K which projects into the tank B is furnished with a cock, L, controlled by the float L', which, when the cock is open, rests on the cross-rod $l$. Through a threaded opening in the top of the tank B passes a threaded portion of the handled rod M, the lower threaded end of which is adapted to the threaded opening $b^2$ communicating with the vessel A. The lower end of the rod is hollow and split, as shown in the enlarged view, Fig. 3, so that by manipulating the handle of the rod the split portion can be more or less exposed, and the flow of liquid increased or diminished. The tank B' has a valved supply-funnel, N, and preferably is furnished with a level-indicator. As the liquid flows from the tank B' to the tank B, and the level of the liquid rises, the valve L is closed by the float L' until the flow through the passage $b^2$ lowers the level sufficiently to again open the valve L. It will be seen then that after filling of the tank B' at intervals, the liquid is automatically supplied to the vessel A, while the flow is rendered uniform by the position of the rod M.

I claim as my invention—

1. The combination of the vessel A and cup b' with the supply-tanks B B and the tubes b b, substantially as described.

2. The combination of the generating-vessel A with the supply-tanks B B and their adjustable regulating-valves, and with tanks B' B' and the automatic valves L L, as and for the purpose set forth.

In testimony whereof I have signed my name to this specification in the presence of two subscribing witnesses.

ALVARO FRANCISCO CARLOS REYNOSO.

Witnesses:
    ALFRED COINY,
    ROBT. M. HOOPER.